(12) United States Patent
Thielert et al.

(10) Patent No.: US 7,036,461 B2
(45) Date of Patent: May 2, 2006

(54) WASTE-HEAT BOILER FOR A CLAUSE PLANT

(75) Inventors: Holger Thielert, Dortmund (DE); Klaus Schüpphaus, Herten (DE)

(73) Assignee: Uhde GmbH, Dortmund (DE)

(*) Notice: Subject to any disclaimer, the term of this patent is extended or adjusted under 35 U.S.C. 154(b) by 0 days.

(21) Appl. No.: 10/521,214

(22) PCT Filed: May 9, 2003

(86) PCT No.: PCT/EP03/04868

§ 371 (c)(1),
(2), (4) Date: Jan. 13, 2005

(87) PCT Pub. No.: WO2004/014790

PCT Pub. Date: Feb. 19, 2004

(65) Prior Publication Data

US 2005/0235926 A1   Oct. 27, 2005

(30) Foreign Application Priority Data

Jul. 25, 2002  (DE) ............................ 102 33 818

(51) Int. Cl.
*F22B 1/18* (2006.01)

(52) U.S. Cl. .................... 122/7 R; 423/574.1

(58) Field of Classification Search ............... 122/7 R, 122/33; 423/574.2, 575, 576, 574.1, 567.1
See application file for complete search history.

(56) References Cited

U.S. PATENT DOCUMENTS

| | | | |
|---|---|---|---|
| 1,957,006 A | 5/1934 | Westcott | |
| 4,249,921 A | 2/1981 | Lell et al. | |
| 4,296,088 A * | 10/1981 | Stauffer | ................. 423/533 |
| 4,303,633 A | 12/1981 | Thomsen | |
| 4,391,791 A | 7/1983 | Palm et al. | |
| 4,632,818 A * | 12/1986 | Chen et al. | ............. 423/574.1 |
| 5,100,640 A * | 3/1992 | Dittmer et al. | .......... 423/574.1 |
| 5,176,896 A | 1/1993 | Bela | |
| 6,800,269 B1 * | 10/2004 | Keller et al. | ............. 423/576.2 |

OTHER PUBLICATIONS

Ullman's Encyclopedia of Technical Chemistry, vol. 21, p. 11, Fig. 7 (To Follow).

* cited by examiner

*Primary Examiner*—Gregory Wilson
(74) *Attorney, Agent, or Firm*—Collard & Roe, P.C.

(57) ABSTRACT

The invention relates to a waste-heat boiler (3) for a Claus plant, comprising a steam generation chamber that is surrounded by a pressure-proof jacket (14), a long tube bundle (18) of heat exchanger tubes that extend through the steam generation chamber and are inserted into tube sheets (19) at both ends, at least one additional tube bundle (20) of shorter heat exchanger tubes, which are likewise inserted into the tube sheets (19) at their outlet ends and open into an influx chamber (21) at their inlet ends, in addition to a head part (22) that is connected to the tube sheet (19) at the outlet end and is subdivided into sections. The long tube bundle (18) is traversed by a hot process gas that emerges from a combustion chamber (2). The influx chamber (21) is located inside the steam generation chamber and is exposed to a cooler process gas (10) from a catalyst stage (4) of the Claus plant. One tube bundle (18, 20) is allocated to each section of the head part (22). Devices for draining condensed sulphur are connected to the sections.

6 Claims, 2 Drawing Sheets

Figure 1:
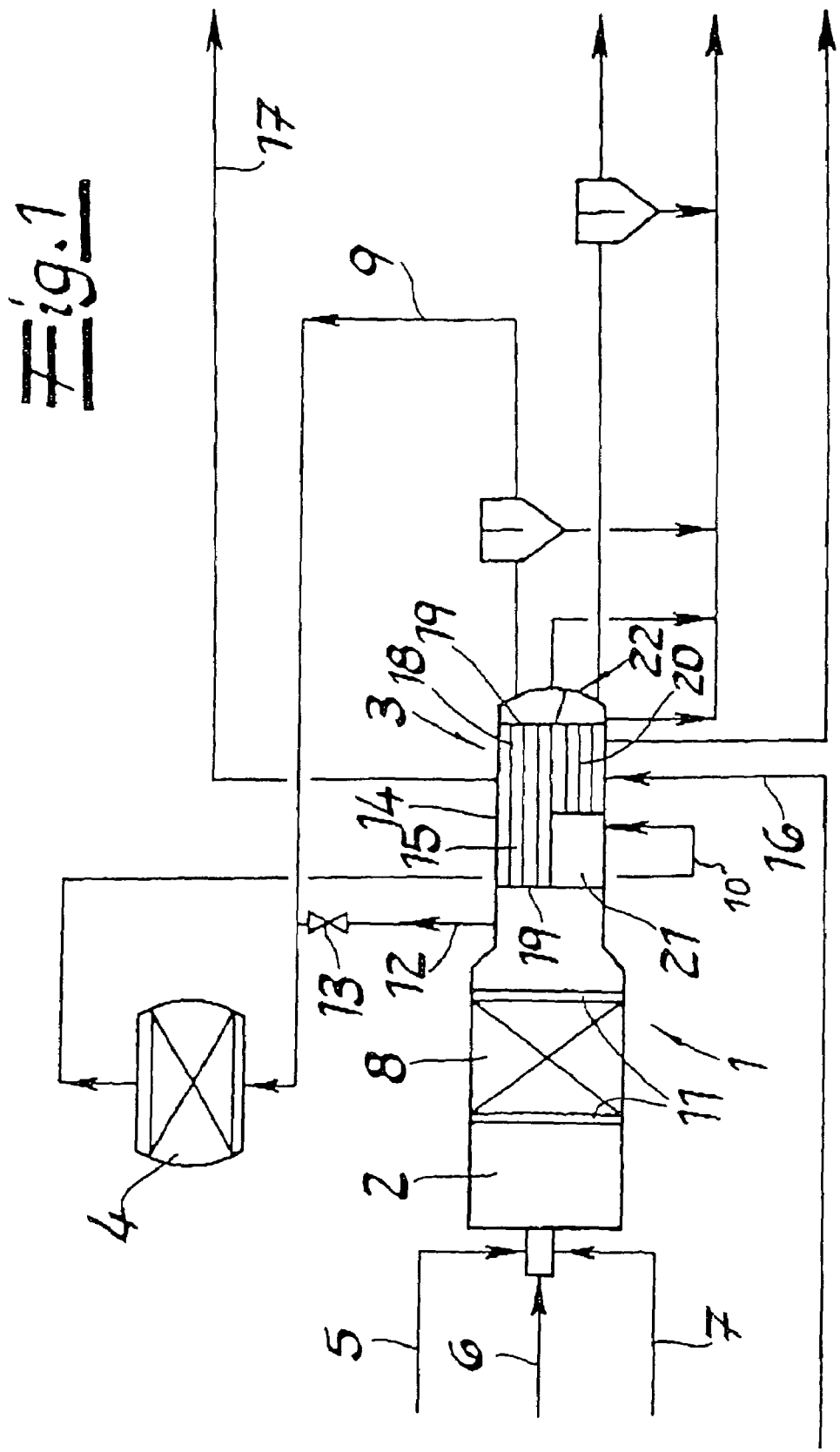

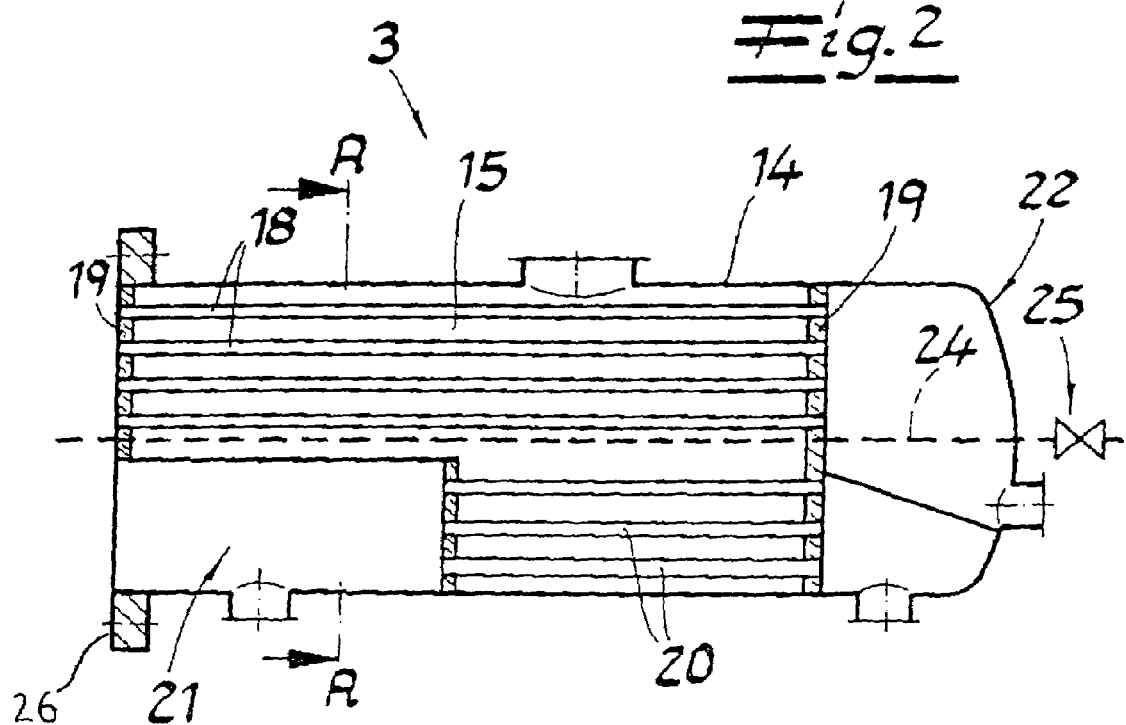
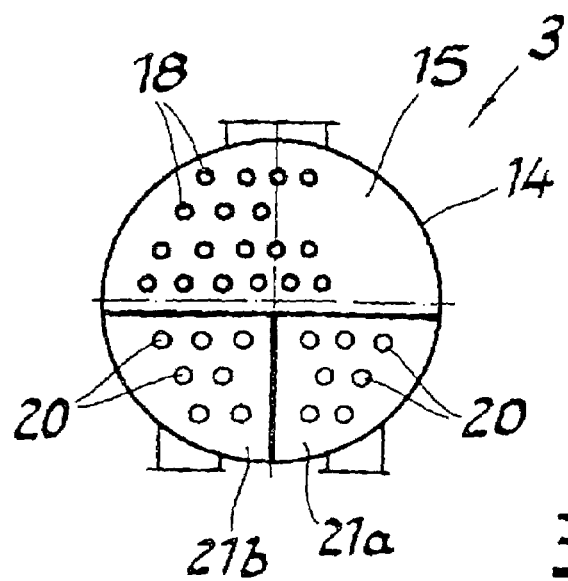

WASTE-HEAT BOILER FOR A CLAUSE PLANT

CROSS REFERENCE TO RELATED APPLICATIONS

Applicant claims priority under 35 U.S.C. §119 of German Application No. 102 33 818.3 filed Jul. 25, 2002. Applicant also claims priority under 35 U.S.C. §365 of PCT/EP2003/04868 filed May 9, 2003. The international application under PCT article 21(2) was not published in English.

The invention relates to a waste heat boiler for a Claus System.

In a Claus system, hydrogen sulfide is converted to elemental sulfur, which condenses by means of cooling of the process gas stream and is separated in liquid form. A Claus system consists, in its fundamental structure, of a combustion chamber, a waste heat boiler, as well as at least one catalyst stage. An acid gas containing $H_2S$ is passed into the chamber together with air and heating gas, where about 60 to 70% of the hydrogen sulfide is converted to sulfur in an exothermic reaction. The process gas leaves the combustion chamber at a temperature of approximately 1200° C., and is cooled to a temperature below 170° C. in the waste heat boiler. After the condensed sulfur has been collected, the process gas is heated again and passed to a catalyst stage in which hydrogen sulfide that is still contained in the process gas is converted to elemental sulfur, at a working temperature below 300° C. The process gas that leaves the catalyst stage is cooled to a temperature required for condensation of the sulfur. After separation of the sulfur, the process gas is regularly passed to another catalyst stage, in which the residual content of hydrogen sulfide is converted to sulfur, which can be collected after the process gas has been cooled once again. Usually, separate waste heat boilers are used for cooling the process gas that has been drawn off from the combustion chamber, on the one hand, and for cooling the process gases that leave the catalyst stage, on the other hand. In Ullmanns Encyklopädie der technischen Chemie [Ullmann's Encyclopedia of Technical Chemistry], Volume 21, page 11, FIG. 7, a Claus system is described that has a two-stage waste heat boiler, in which the process gas from the combustion chamber as well as the process gas from a catalyst stage are cooled off. The design of the waste heat boiler is not described. Because of the great temperature differences between the process gas streams that enter, significant heat stresses must be feared, which are difficult to master in a single apparatus.

The invention is based on the task of indicating a waste heat boiler for a Claus system for the production of low-tension steam, which has a simple construction and allows both cooling of the hot process gas that leaves the combustion chamber and cooling of the cooler process gases that leave the catalyst stages, in a single apparatus.

The object of the invention and the solution for this task is a waste heat boiler for a Claus system having
- a steam generator chamber surrounded by a pressure-resistant mantle,
- a long tube bundle of heat exchanger tubes, which extend through the steam generator chamber and are inserted into tube plates that delimit the steam generator chamber, at both ends,
- at least one additional tube bundle of shorter heat exchanger tubes, which are also inserted into the tube plate at their exit-side end, and open into an in-flow chamber at their entry-side end, and
- a head piece that follows the tube plate at the exit-side end and is subdivided into sections, whereby a hot process gas that exits from a combustion chamber flows through the long tube bundle, whereby the in-flow chamber is disposed within the steam generator chamber, and has a cooler process gas from a catalyst stage of the Claus system applied to it, whereby a tube bundle is assigned to each section of the head piece, in each instance, and whereby devices for conducting condensed sulfur away are connected to the sections.

The waste heat boiler is disposed horizontally. Usual devices for a regulated boiler feed water supply as well as steam exhaust devices are connected with the steam generator chamber. Because of the in-flow chamber integrated into the steam generator space, the different gas entry temperatures can be mastered without requiring complicated measures for equalizing heat expansions.

According to a preferred embodiment of the invention, a head piece having a connecting flange for a direct attachment to the combustion chamber or to a splitting reactor of the Claus system that contains the combustion chamber is connected with the inlet-side tube plate. The in-flow chamber has a mantle-side gas inlet for the process gas. If the Claus system has two or more catalyst stages that are operated at working temperatures between 200° C. and 300° C., it is practical if the in-flow chamber is subdivided into in-flow chamber sections, whereby the in-flow chamber sections have a mantle-side gas inlet for the process gas from a catalyst stage of the Claus system, in each instance.

According to a preferred embodiment of the invention, the position of the in-flow chamber is coordinated with the temperature profile that occurs within the heat exchanger tubes of the long tube bundle, in such a manner that the temperature differences between the in-flow chamber and the local temperature of the process gas passing through the long tube bundle are less than 150° C. In the case of optimal coordination, the temperature differences in the tubes should be as slight as possible in every cross-section of the apparatus.

After the deposition of condensed sulfur, the process gas must be heated to a temperature above the sulfur condensation temperature, before the process gas enters into the catalyst stage. It is practical if heating takes place by mixing in hot process gas. In a further development, the invention teaches that an additional tube for hot process gas is passed through the steam generator chamber, which gas also exits from the additional tube at a high temperature, and can be used for heating the process gas stream, which has been cooled to a temperature below the condensation temperature of sulfur. On the out-flow side of the additional tube, a device for controlling the amount of the process gas stream that is passed through the additional tube is provided.

The waste heat boiler according to the invention results in a significant simplification of the Claus system in terms of apparatus technology. The tubing is simplified. Intermediate heaters and condensers are eliminated. Boiler feed water regulation, which is always complicated, has to be made available only for a single apparatus.

In the following, the invention will be explained using a drawing that depicts an exemplary embodiment, which merely serves as an example. The drawing schematically shows:

FIG. 1 a Claus system having a waste heat boiler configured according to the invention, FIG. 2 another embodiment of the waste heat boiler, and FIG. 3 the section A—A in FIG. 2.

Hydrogen sulfide is converted to elemental sulfur in the Claus system shown in FIG. 1. The fundamental structure of the system includes a splitting reactor 1 having a combustion chamber 2, a waste heat boiler 3 connected with the gas outlet of the splitting reactor 1, as well as a catalyst stage 4. An acid gas 5 that contains hydrogen sulfide is introduced into the combustion chamber 2 of the splitting reactor 1, which, in the exemplary embodiment, contains a bulk catalyst 8, in addition to the combustion chamber 2, together with air 6 and heating gas 7. The process gas leaves the splitting reactor 1 at a temperature of approximately 1200° C. and is cooled to a temperature of less than 170° C., as required for condensation of the sulfur, in the waste heat boiler 3. The condensed sulfur is precipitated. After precipitation of the sulfur, the cooled process gas 9 is heated and passed to the catalyst stage 4, in which the sulfur compounds are converted to elemental sulfur on a catalyst. The catalyst stage 4 is operated at a temperature of less than 300° C. The process gas that leaves the catalyst stage 4 is also cooled to a temperature required for condensation of the sulfur in the waste heat boiler 3. The condensed sulfur is removed.

The splitting reactor 1 consists of a horizontal cylindrical boiler lined with refractory material, in which the combustion chamber 2, a catalyst chamber containing the bulk catalyst 8, as well as an out-flow side chamber are disposed, next to one another. The in-flow opening and the gas outlet are disposed on opposite faces of the boiler. The catalyst chamber is delimited by gas-permeable checker bricks 11 on both sides, and has a mantle-side filling opening for introducing the bulk catalyst 8. It is practical if the checker bricks 11 contain oblong holes. A branch line 12 that is lined with refractory material is connected at the circumference of the out-flow side chamber, which line opens into an adjacent process gas line. A valve 13 is disposed in the opening region of the branch line 12, and this valve can regulate the amount of flow of the hot gas stream that exits from the branch line 12. In this connection, the valve body of the valve 13 is cooled by the cool process gas 9, so that usual metallic materials can be used for the valve body.

The waste heat boiler 3 has a steam generator chamber surrounded by a pressure-resistant mantle 14, to which chamber a supply device 16 for boiler feed water as well as an exhaust device 17 for low-tension steam are connected. The waste heat boiler 3 contains a long tube bundle 18 of heat exchanger tubes that extend through the steam generator chamber and are inserted into tube plates 19 at both ends, which plates delimit the steam generator space. Furthermore, at least one additional tube bundle 20 of shorter heat exchanger tubes is provided, which are also inserted into the tube plate 19 at their exit-side end, and open into an in-flow chamber 21 at their entry-side end. The hot process gas that exits from the combustion chamber, i.e. the splitting reactor 1, flows through the long tube bundle 18. The in-flow chamber 21 is disposed within the steam generator chamber 15 and has the cooler process gas 10 from the catalyst stage 4 applied to it. The waste heat boiler 3 furthermore has a head piece 22 that follows the tube plate 19 on the exit-side end, and is subdivided into sections. A tube bundle 18, 20 is assigned to every section of the head piece, in each instance. Devices for conducting away condensed sulfur are connected with the sections.

On the entry side, the waste heat boiler 3 is directly connected with the splitting reactor 1. It has a corresponding head piece with a connecting flange 26. The cooler process gas drawn from the catalyst stage 4 can be fed into the in-flow chamber 21 by way of a mantle-side gas inlet. The application point for the cooler process gas is selected in such a manner, along the waste heat boiler 3, that no overly great temperature differences occur in the tubes, and the heat stresses can be mastered. In the exemplary embodiment, the position of the in-flow chamber 21 is coordinated with the temperature profile that occurs within the heat exchanger tubes of the long tube bundle 18, in such a manner that the temperature differences between the in-flow chamber 2 and the local temperature of the process gas that is conducted through the long tube bundle 18 are less than 150° C.

The embodiment shown in FIGS. 2 and 3 is intended for a Claus system that has a combustion chamber, i.e. a splitting reactor, and two catalyst stages operated at a temperature below 300° C. The in-flow chamber 21 is subdivided into in-flow chamber sections 21a, 21b, each of which has a mantle-side gas inlet for the process gas from a catalyst stage. It is understood that the gas-exit-side head piece 22 is also subdivided into a corresponding number of sections. In FIG. 2, it is furthermore indicated with a broken line that the waste heat boiler can have an additional tube 24 for hot process gas that is passed through the steam generator chamber and is equipped with a device 25 for controlling the amount of process gas flow at the exit-side end. The additional tube 24 is designed in such a manner that the process gas also exits from the additional tube 24 at a high temperature, and can be used to heat the process gas stream that has been cooled to a temperature below the condensation temperature of sulfur. The additional tube 24 thereby replaces a by-pass line.

The invention claimed is:

1. Waste heat boiler for a Claus system, having
 a steam generator chamber surrounded by a pressure-resistant mantle (14),
 a long tube bundle (18) of heat exchanger tubes, which extend through the steam generator chamber and are inserted into tube plates (19) that delimit the steam generator chamber, at both ends,
 at least one additional tube bundle (20) of shorter heat exchanger tubes, which are also inserted into the tube plate (19) at their exit-side end, and open into an in-flow chamber (21) at their entry-side end, and
 a head piece (22) that follows the tube plate (19) at the exit-side end and is subdivided into sections,
 whereby a hot process gas that exits from a combustion chamber (2) flows through the long tube bundle (18), whereby the in-flow chamber (21) is disposed within the steam generator chamber, and has a cooler process gas (10) from a catalyst stage (4) of the Claus system applied to it, whereby a tube bundle (18, 20) is assigned to each section of the head piece (22), in each instance, and whereby devices for conducting condensed sulfur away are connected to the sections.

2. Waste heat boiler as recited in claim 1, wherein a head piece having a connecting flange for a direct attachment to the combustion chamber or to a splitting reactor that contains the combustion chamber is connected with the inlet-side tube plate.

3. Waste heat boiler as recited in claim 1, wherein the in-flow chamber (21) has a mantle-side gas inlet for the process gas.

4. Waste heat boiler as recited in claim 1, wherein the in-flow chamber (21) is subdivided into in-flow chamber sections (21a, 21b), whereby the in-flow chamber sections (21a, 21b) have a mantle-side gas inlet for the process gas from a catalyst stage of the Claus system, in each instance.

5. Waste heat boiler as recited in claim 1, wherein position of the in-flow chamber (21) is coordinated with the temperature profile that occurs within the heat exchanger tubes of the long tube bundle (18), in such a manner that the temperature differences between the in-flow chamber (21) and the local temperature of the process gas passing through the long tube bundle (18) are less than 150° C.

6. Waste heat boiler as recited in claim 1, wherein an additional tube (24) for hot process gas that is passed through the steam generator chamber, and a device (25) for controlling the amount of process gas flow through the additional tube (24), provided on the out-flow side, whereby the process gas also exits from the additional tube (24) at a high temperature, and can be used for heating the process gas stream, which has been cooled to a temperature below the condensation temperature of sulfur.

* * * * *

UNITED STATES PATENT AND TRADEMARK OFFICE
CERTIFICATE OF CORRECTION

PATENT NO. : 7,036,461 B2  Page 1 of 1
APPLICATION NO. : 10/521214
DATED : May 2, 2006
INVENTOR(S) : Thielert et al.

It is certified that error appears in the above-identified patent and that said Letters Patent is hereby corrected as shown below:

In particular, on the cover page, Item [54], and at column 1, line 1 please change "CLAUSE" to correctly read:
--CLAUS--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,036,461 B2 Page 1 of 1
APPLICATION NO. : 10/521214
DATED : May 2, 2006
INVENTOR(S) : Thielert et al.

It is certified that error appears in the above-identified patent and that said Letters Patent is hereby corrected as shown below:

In particular, on the cover page, Item [54] and at column 1, line 1, please change "CLAUSE" to correctly read:
--CLAUS--.

Signed and Sealed this

Fifth Day of September, 2006

JON W. DUDAS
*Director of the United States Patent and Trademark Office*